(12) United States Patent
Kaneko et al.

(10) Patent No.: US 10,067,392 B2
(45) Date of Patent: Sep. 4, 2018

(54) DISPLAY DEVICE

(71) Applicant: Japan Display Inc., Tokyo (JP)

(72) Inventors: Hideki Kaneko, Tokyo (JP); Kentaro Okuyama, Tokyo (JP); Hiroshi Inamura, Tokyo (JP); Hiroki Sugiyama, Tokyo (JP); Manabu Mizuno, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/440,180

(22) Filed: Feb. 23, 2017

(65) Prior Publication Data

US 2017/0255072 A1    Sep. 7, 2017

(30) Foreign Application Priority Data

Mar. 4, 2016   (JP) ................. 2016-042808

(51) Int. Cl.
| | |
|---|---|
| *G02F 1/1362* | (2006.01) |
| *G02F 1/1333* | (2006.01) |
| *G02F 1/1368* | (2006.01) |
| *G02F 1/1339* | (2006.01) |
| *G02F 1/1334* | (2006.01) |
| *G02F 1/137* | (2006.01) |
| *G02F 1/1335* | (2006.01) |

(52) U.S. Cl.
CPC ........ *G02F 1/136209* (2013.01); *G02F 1/137* (2013.01); *G02F 1/1334* (2013.01); *G02F 1/1368* (2013.01); *G02F 1/133345* (2013.01); *G02F 1/133553* (2013.01); *G02F 1/136286* (2013.01); *G02F 1/1339* (2013.01); *G02F 2001/13756* (2013.01); *G02F 2201/121* (2013.01); *G02F 2201/123* (2013.01)

(58) Field of Classification Search
CPC ......... G02F 1/136209; G02F 1/133345; G02F 1/1368; G02F 1/1339; G02F 1/13394; G02F 2001/13398
See application file for complete search history.

(56) References Cited

U.S. PATENT DOCUMENTS

| | | |
|---|---|---|
| 6,297,862 B1 | 10/2001 | Murade |
| 2004/0233378 A1 | 11/2004 | Okamoto et al. |
| 2009/0219471 A1 | 9/2009 | Mochiku |
| 2010/0085510 A1 | 4/2010 | Okuyama et al. |

(Continued)

FOREIGN PATENT DOCUMENTS

| | | |
|---|---|---|
| JP | 2001-228454 A | 8/2001 |
| JP | 2001-337330 A | 12/2001 |

(Continued)

*Primary Examiner* — Jia Pan
(74) *Attorney, Agent, or Firm* — K&L Gates LLP (57) ABSTRACT

A display device according to one aspect of the present invention includes a first substrate including a thin film transistor, a second substrate including a common electrode, an organic insulating layer arranged on the first substrate so as to overlap with the thin film transistor, and projecting from the first substrate toward the second substrate, and a conductive light shielding layer covering an upper surface and a side surface of the organic insulating layer, and electrically coupled with the common electrode, wherein the organic insulating layer and the light shielding layer hold a gap between the first substrate and the second substrate.

8 Claims, 10 Drawing Sheets

(56) References Cited

U.S. PATENT DOCUMENTS

| | | |
|---|---|---|
| 2010/0165450 A1 | 7/2010 | Okuyama et al. |
| 2011/0102698 A1* | 5/2011 | Wang .................. G02F 1/13338 349/54 |
| 2011/0109663 A1 | 5/2011 | Uchida et al. |
| 2011/0128491 A1* | 6/2011 | Kubota ............. G02F 1/133707 349/139 |
| 2011/0134350 A1* | 6/2011 | Yamazaki ............. G02F 1/1368 349/43 |
| 2011/0141551 A1 | 6/2011 | Uchida et al. |
| 2011/0242146 A1 | 10/2011 | Uchida et al. |
| 2012/0274867 A1 | 11/2012 | Shinkai et al. |
| 2012/0314178 A1 | 12/2012 | Doi et al. |
| 2013/0229595 A1 | 9/2013 | Shinkai et al. |
| 2015/0109763 A1 | 4/2015 | Shinkai et al. |
| 2016/0116768 A1 | 4/2016 | Okuyama et al. |
| 2016/0163271 A1 | 6/2016 | Sakaigawa et al. |
| 2017/0031187 A1 | 2/2017 | Douyou |

FOREIGN PATENT DOCUMENTS

| | | |
|---|---|---|
| JP | 2004-347941 A | 12/2004 |
| JP | 2006-220702 A | 8/2006 |
| JP | 2007-072114 A | 3/2007 |
| JP | 2009-205051 A | 9/2009 |
| JP | 2012-255851 A | 12/2012 |
| WO | 98/16868 A1 | 4/1998 |

* cited by examiner

DISPLAY DEVICE

CROSS-REFERENCE TO RELATED APPLICATIONS

This application claims priority from Japanese Application No. 2016-042808, filed on Mar. 4, 2016, the contents of which are incorporated by reference herein in its entirety.

BACKGROUND

1. Technical Field

The present disclosure relates to a display device.

2. Description of the Related Art

When light enters a thin film transistor, optical leak occurs. Therefore, a light shielding layer is provided near the thin film transistor (for example, see Japanese Patent Application Laid-open Publication No. 2009-205051, International Patent Publication WO 98/16868, Japanese Patent Application Laid-open Publication No. 2004-347941, Japanese Patent Application Laid-open Publication No. 2007-72114, Japanese Patent Application Laid-open Publication No. 2001-337330, Japanese Patent Application Laid-open Publication No. 2001-228454, and Japanese Patent Application Laid-open Publication No. 2012-255851).

The light entering from an upper portion of the thin film transistor is shielded by the light shielding layer provided on a counter substrate side. However, in this configuration, a distance between the light shielding layer and the thin film transistor becomes large, and thus the light entering from a wide angle direction is not sufficiently shielded. If the area of the light shielding layer is made large, the light shielding capability is increased. However, an aperture ratio is decreased and thus it is not favorable.

In recent years, display devices from which a light-guiding plate is omitted, and which have light directly enter an end portion of a display panel and modulate the light propagated inside the display panel with a liquid crystal layer have been proposed. In these display devices, an angle of the light entering the thin film transistor is large, and thus the above-described problem becomes pronounced.

To increase the light shielding capability, the light shielding layer is favorably formed of conductive material such as metal. However, if the light shielding layer is formed of the conductive material, a potential of the light shielding layer becomes unstable, and display failure may occur. Providing routing wiring in a counter substrate to fix the potential of the light shielding layer can be considered. However, the structure becomes complicated.

SUMMARY

A display device according to one aspect of the present invention includes a first substrate including a thin film transistor, a second substrate including a common electrode, an organic insulating layer arranged on the first substrate so as to overlap with the thin film transistor, and projecting from the first substrate toward the second substrate, and a conductive light shielding layer covering an upper surface and a side surface of the organic insulating layer, and electrically coupled with the common electrode, wherein the organic insulating layer and the light shielding layer hold a gap between the first substrate and the second substrate.

DETAILED DESCRIPTION

Forms for implementing the invention (embodiments) will be described in detail with reference to the drawings. The present invention is not limited by content described in the embodiments below. Configuration elements described below include elements easily conceived by a person skilled in the art and elements substantially the same. Further, the configuration elements described below can be appropriately combined. The disclosure is merely an example, and appropriate modifications which maintain the points of the invention, and which can be easily arrived at by a person skilled in the art, are obviously included in the scope of the present invention. To make description more clear, the drawings may be schematically illustrated in the width, thickness, shape, and the like of respective portions, compared with actual forms. However, such illustration is merely an example, does not limit the construction of the present invention. In the present specification and drawings, elements similar to those described with respect to the drawings that have already been mentioned are denoted with the same reference signs, and detailed description may be appropriately omitted.

First Embodiment

Figure 1:
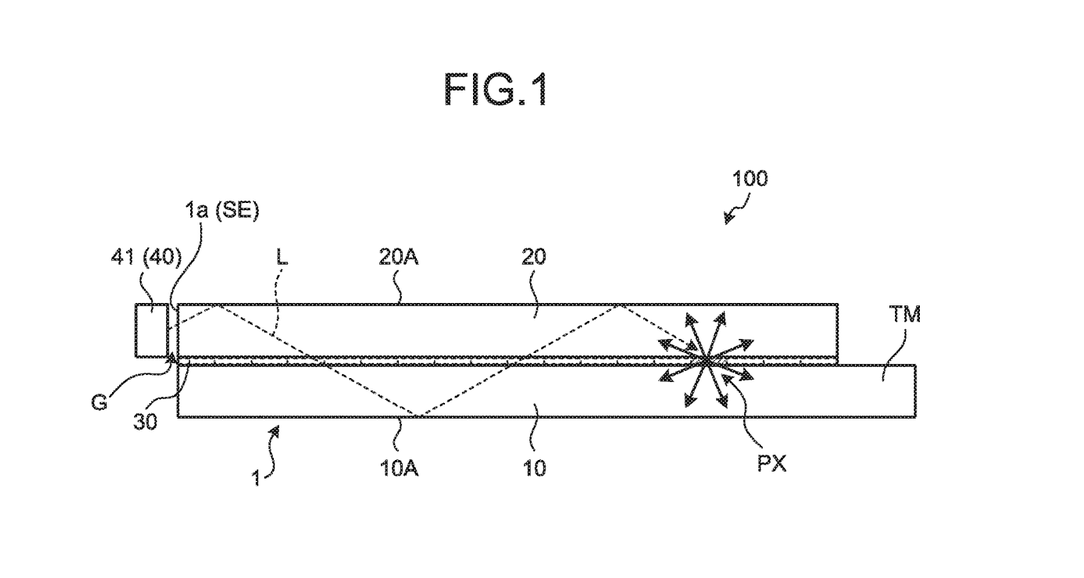
FIG. 1 is a sectional view of a display device according to a first embodiment.
Figure 2:
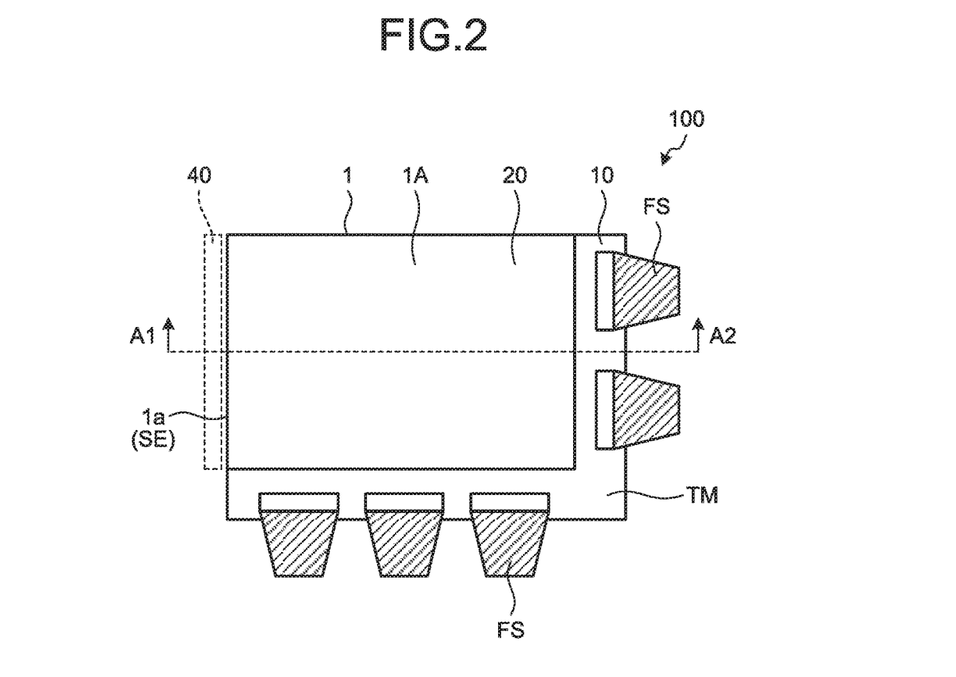
FIG. 2 is a plan view of the display device.
Figure 3:
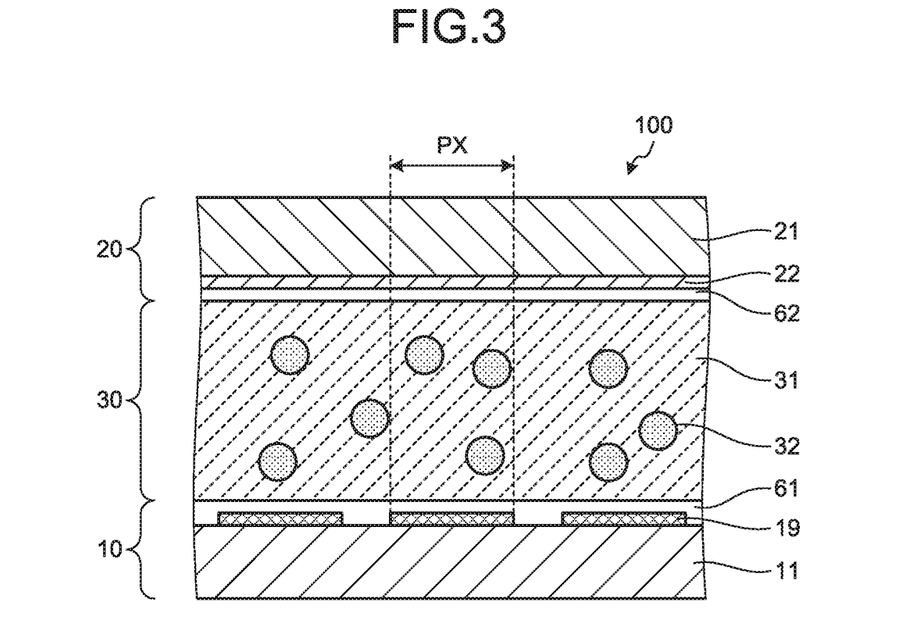
FIG. 3 is a sectional view illustrating a configuration of a liquid crystal layer.
Figure 4:
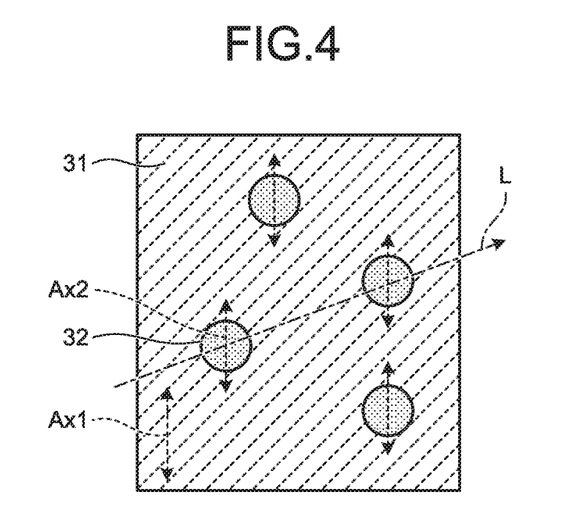
FIG. 4 is a sectional view illustrating the liquid crystal layer in a non-scattering state.
Figure 5:
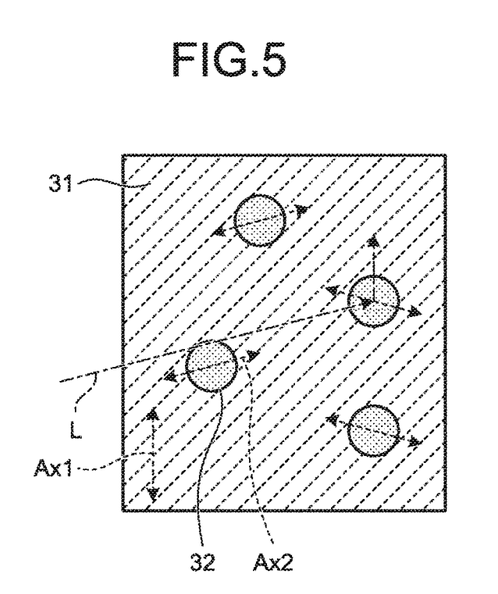
FIG. 5 is a sectional view of the liquid crystal layer in a scattering state.
Figure 6:
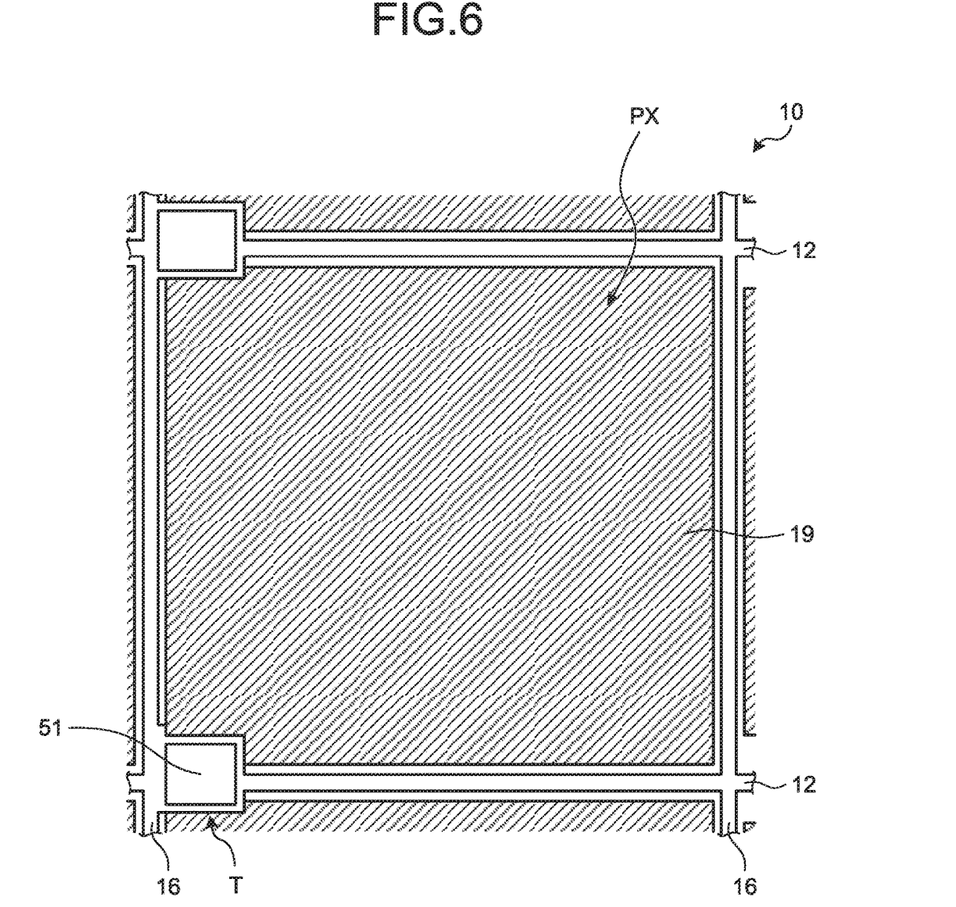
FIG. 6 is a schematic plan view of one pixel of the display device.
Figure 7:
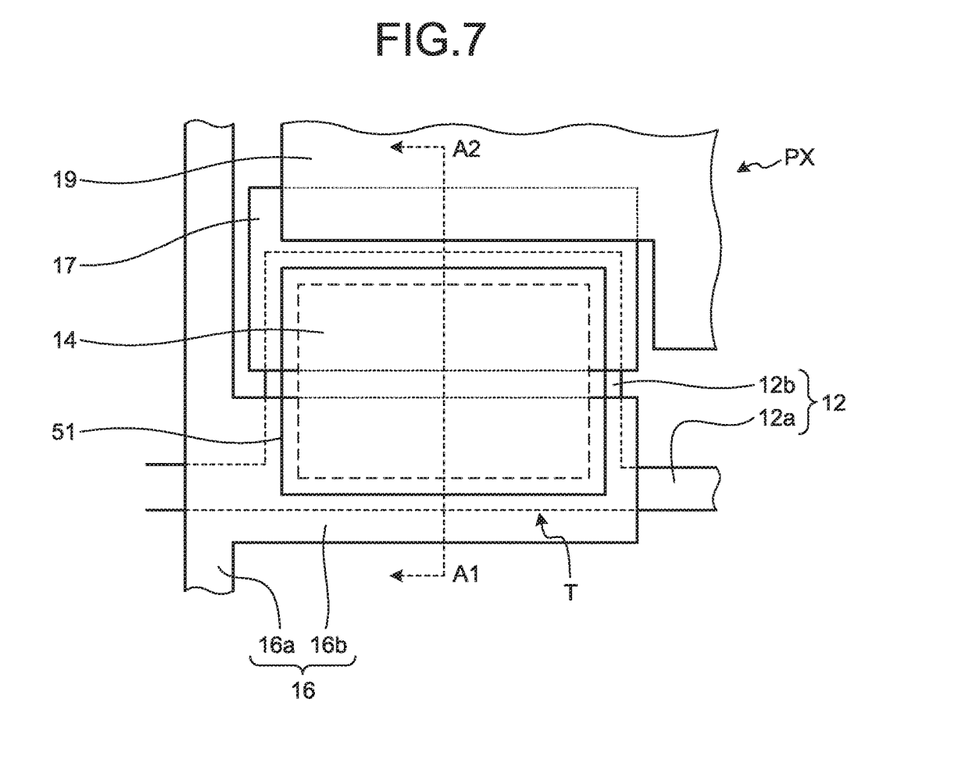
FIG. 7 is a plan view illustrating a structure of a thin film transistor and its periphery.
Figure 8:
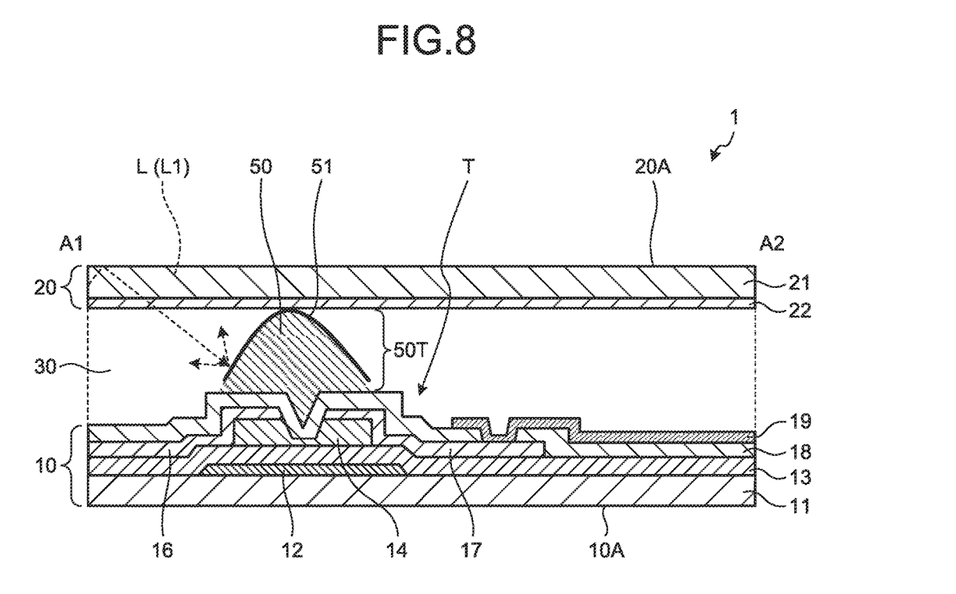
FIG. 8 is a sectional view along an A3-A4 line of FIG. 7.

FIG. 1 is a sectional view of a display device 100 according to a first embodiment. FIG. 2 is a plan view of the display device 100. FIG. 1 is a sectional view along an A1-A2 line of FIG. 2. FIG. 3 is a sectional view illustrating a configuration of a liquid crystal layer 30. FIG. 4 is a sectional view illustrating a liquid crystal layer 30 in a non-scattering state. FIG. 5 is a sectional view of the liquid crystal layer 30 in a scattering state. FIG. 6 is a schematic plan view of one pixel PX of the display device 100. FIG. 7 is a plan view illustrating a structure of a thin film transistor T and its periphery. FIG. 8 is a sectional view along an A3-A4 line of FIG. 7. Hereinafter, a state as viewed from a layer-thickness direction of the liquid crystal layer 30 is referred to as plan view, and a state as viewed from a direction perpendicular to the layer-thickness direction of the liquid crystal layer 30.

As illustrated in FIGS. 1 and 2, the display device 100 includes a display panel 1 and a light source unit 40. The display panel 1 includes a first substrate 10, a second substrate 20, and a liquid crystal layer 30. The display panel 1 is provided with a plurality of pixels PX. In plan view, an overlapping area of the first substrate 10 and the second substrate 20 is a display area 1A. The display area 1A is provided with the plurality of pixels PX in a matrix manner. In plan view, the first substrate 10 includes a terminal portion TM extending to an outside of the second substrate 20. A plurality of flexible circuit substrates FS is electrically coupled with the terminal portion TM.

As illustrated in FIGS. 6 and 8, the first substrate 10 includes a pixel electrode 19 and a thin film transistor T for each pixel PX. The second substrate 20 includes a common electrode 22 common to the pixels PX. The scattering state of the liquid crystal layer 30 is controlled for each pixel PX with a voltage applied between the pixel electrode 19 and the common electrode 22.

As illustrated in FIG. 1, in cross section view, an end portion of the display panel 1 is provided with the light source unit 40. The light source unit 40 is arranged in at least one end surface of the first substrate 10 and the second substrate 20. The light source unit 40 irradiates a first end surface 1a of the display panel 1 with light L, for example. The first end surface 1a of the display panel 1, the first end surface 1a facing the light source unit 40, is a light incident surface SE. A gap is provided between the light source unit 40 and the light incident surface SE. The gap is an air layer G.

The light L emitted from the light source unit 40 is propagated in a direction away from the light incident surface SE while being reflected at an outer surface (a surface on an opposite side to the liquid crystal layer 30 side) 10A of the first substrate 10 and an outer surface 20A of the second substrate 20 in cross section view. The light L propagated inside the display panel 1 is scattered in the pixel PX where the liquid crystal layer 30 is in the scattering state, and is emitted outside the display panel 1. The light L radiated to an outside of the display panel 1 is observed by an observer as image light.

As illustrated in FIG. 3, the liquid crystal layer 30 includes a bulk 31 formed of a polymer and a plurality of fine particles 32 dispersed in the bulk 31. The fine particles 32 include liquid crystal. The bulk 31 and the fine particles 32 have optical anisotropy.

The liquid crystal layer 30 is formed by the next method, for example. First, a solution in which liquid crystal is dispersed in a monomer for the polymer is filled between the first substrate 10 and the second substrate 20. The first substrate 10 is provided with a first orientation film 61. The second substrate 20 is provided with a second orientation film 62. The first orientation film 61 and the second orientation film 62 are, for example, vertical orientation films.

Next, the monomer is polymerized by ultraviolet rays or heat to form the bulk 31 in a state where the monomer and the liquid crystal are orientated by the first orientation film 61 and the second orientation film 62. Accordingly, the reverse mode polymer dispersed liquid crystal layer 30 is formed, in which the liquid crystal is dispersed in gaps of a polymer network formed in a mesh manner.

The orientation of the liquid crystal included in the fine particles 32 is controlled by the voltage applied between the pixel electrode 19 and the common electrode 22. With change of the orientation of the liquid crystal, the degree of scattering of the light L is changed. The liquid crystal layer 30 modulates the light L by changing the degree of scattering of the light L. The brightness of the light L radiated from the display panel 1 to an outside is changed according to the degree of scattering of the light L.

For example, as illustrated in FIG. 4, the direction of an optical axis Ax1 of the bulk 31 and the direction of an optical axis Ax2 of the fine particle 32 are equal to each other in a state where no voltage is applied between the pixel electrode 19 and the common electrode 22. The optical axis Ax2 of the fine particle 32 is parallel to the layer-thickness direction of the liquid crystal layer 30. The optical axis Ax1 of the bulk 31 is parallel to the layer-thickness direction of the liquid crystal layer 30 regardless of existence/non-existence of the voltage.

The ordinary ray refractive index of the bulk 31 and the ordinary ray refractive index of the fine particle 32 are equal to each other. The extraordinary ray refractive index of the bulk 31 and the extraordinary ray refractive index of the fine particle 32 are equal to each other. In the state where no voltage is applied between the pixel electrode 19 and the common electrode 22, a difference in the refractive index between the bulk 31 and the fine particle 32 becomes zero in every direction. The liquid crystal layer 30 is in the non-scattering state where the liquid crystal layer 30 does not scatter the light L. The light L is propagated in the direction away from the light source unit 40 while being reflected between the first substrate 10 and the second substrate 20.

As illustrated in FIG. 5, in a state where the voltage is applied between the pixel electrode 19 and the common electrode 22, the optical axis Ax2 of the fine particle 32 is inclined by an electric field occurring between the pixel electrode 19 and the common electrode 22. Since the optical axis Ax1 of the bulk 31 is not changed by the electric field, the direction of the optical axis Ax1 of the bulk 31 and the direction of the optical axis Ax2 of the fine particle 32 are different from each other. The liquid crystal layer 30 is the scattering state where the liquid crystal layer 30 scatters the light L. The light L is propagated while being reflected between the first substrate 10 and the second substrate 20, and is scattered in the pixel PX in the scattering state. The scattered light L is radiated to an outside of the display panel 1, and is observed as image light.

An example in which the first orientation film 61 and the second orientation film 62 are vertical orientation films has been described. However, the first orientation film 61 and the second orientation film 62 may be horizontal orientation films. The first orientation film 61 and the second orientation film 62 may just have the function to orientate the monomer in a predetermined direction in polymerizing the monomer. Accordingly, the monomer becomes a polymerized polymer in a state of being orientated in the predetermined direction. In a case where the first orientation film 61 and the second orientation film 62 are the horizontal orientation films, the direction of the optical axis Ax1 of the bulk 31 and the direction of the optical axis Ax2 of the fine particle 32 are equal to each other and become a direction perpendicular to a film thickness direction in the state where no voltage is applied between the pixel electrode 19 and the common electrode 22. The direction perpendicular to the film thickness direction corresponds to a direction along a side of the first substrate 10 in a plan view.

As illustrated in FIGS. 6 and 7, the first substrate 10 is provided with a plurality of gate lines (also referred to as scanning lines) 12 and a plurality of data lines (also referred to as signal lines) 16 in a grid manner in plan view. The pixels PX are provided corresponding to intersection portions between the plurality of gate lines 12 and the plurality of data lines 16. The pixel PX is provided with the pixel electrode 19 and the thin film transistor T. The thin film transistor T is a bottom gate thin film transistor. The thin film transistor T includes a semiconductor layer 14 superimposed with a part of the gate line 12 in plan view.

The gate line 12 includes a linearly extending main line portion 12a and a branch portion 12b branching from the main line portion 12a. The semiconductor layer 14 is superimposed with the gate line 12, for example, a central portion of the branch portion 12b. The semiconductor layer 14 is provided not to protrude from the gate line 12 in plan view. Accordingly, the light L heading toward the semiconductor layer 14 from the gate line 12 side is reflected, and leakage of the light is less likely to occur in the semiconductor layer 14. The light L reflected at the gate line 12 is propagated inside the display panel 1 and contributes to image display. The part of the gate line 12, the part being superimposed with the semiconductor layer 14 in plan view, functions as a gate electrode of the thin film transistor T.

The data line 16 includes a linearly extending main line portion 16a and a branch portion 16b branching from the main line portion 16a. The branch portion 16b is superimposed with one end portion of the semiconductor layer 14 in plan view. A portion of the branch portion 16b, the portion being superimposed with the semiconductor layer 14, function as a source electrode of the thin film transistor T.

An electrode 17 is provided in a position adjacent to the branch portion 16b across a central portion of the semiconductor layer 14 in plan view. The electrode 17 is superimposed with the other end portion of the semiconductor layer 14 in plan view. A portion of the semiconductor layer 14, the portion being not superimposed with the branch portion 16b and the electrode 17, functions as a channel forming portion of the thin film transistor T. An end portion of the electrode 17 is electrically coupled with the pixel electrode 19.

A light shielding layer 51 is provided in the thin film transistor T on the second substrate 20 side. The gate line 12 is provided on an opposite side to the light shielding layer 51 side across the semiconductor layer 14. The semiconductor layer 14 is provided not to protrude from the light shielding layer 51 and the gate line 12. The light shielding layer 51 is provided not to protrude from the gate line 12 as viewed from the second substrate 20 side. The light L heading toward the semiconductor layer 14 from the outer surface 20A side is shielded by the light shielding layer 51. The light L heading toward the semiconductor layer 14 from the outer surface 10A side is shielded by the gate line 12.

As illustrated in FIG. 8, the first substrate 10 includes a first base material 11 made of a transparent insulating member such as glass or plastic. The gate line 12 is provided on the first base material 11. The gate line 12 includes a structure in which a molybdenum layer, an aluminum layer, and a molybdenum layer are laminated in order, for example. A gate insulating layer 13 is provided to cover the gate line 12 on the first base material 11. The gate insulating layer 13 includes, for example, a transparent inorganic insulating member such as silicon nitride.

The semiconductor layer 14 is laminated on the gate insulating layer 13. The semiconductor layer 14 includes amorphous silicon, and may includes polysilicon.

The data line 16 that covers a part of the semiconductor layer 14 and the electrode 17 that covers a part of the semiconductor layer 14 are provided on the gate insulating layer 13. The data line 16 and the electrode 17 have, for example, a structure in which a molybdenum layer, an aluminum layer, and a molybdenum layer are laminated in order. A passivation layer 18 is provided on the semiconductor layer 14, the data line 16, and the electrode 17. The passivation layer 18 includes, for example, a transparent inorganic insulating member such as silicon nitride.

The pixel electrode 19 and an organic insulating layer 50 are provided on the passivation layer 18. The pixel electrode 19 includes a transparent conductive member such as indium tin oxide (ITO). The pixel electrode 19 is electrically coupled with the electrode 17 through a contact hole provided in the passivation layer 18.

The organic insulating layer 50 is arranged on the first substrate 10 so as to overlap with the thin film transistor T. The organic insulating layer 50 projects from the first substrate 10 toward the second substrate 20. The organic insulating layer 50 has a tapered portion 50T that has a tapered shape in which a bottom surface facing the first substrate 10 is larger than an upper surface facing the second substrate 20, for example. More specifically, the projecting portion of the organic insulating layer 50 that projects from the first substrate 10 toward the second substrate 20 is the tapered portion 50T. The organic insulating layer 50 is formed by, for example, patterning a positive resist by exposure processing and developing processing, and deforming the positive resist by heating treatment.

The conductive light shielding layer 51 is provided on the organic insulating layer 50. The light shielding layer 51 covers an upper surface and a side surface of the organic insulating layer 50. The light shielding layer 51 includes a light reflecting member that reflects the light L propagated inside the display panel 1. As the light reflecting member, a metal member having high optical reflectance such as aluminum is suitable. An outer edge portion of the light shielding layer 51 is arranged on the organic insulating layer 50, and is not in contact with the passivation layer 18 and the pixel electrode 19. Therefore, the light shielding layer 51 is electrically insulated from the pixel electrode 19.

The second substrate 20 includes a second base material 21 made of a transparent insulating member such as glass or plastic. The common electrode 22 is provided on the second base material 21. The common electrode 22 includes a transparent conductive member such as ITO.

The light shielding layer 51 is in contact with the second substrate 20, and is electrically coupled with the common electrode 22. As illustrated in FIG. 3, the second orientation film 62 is provided on the common electrode 22. Electric resistance of the second orientation film 62 is high, and the second orientation film 62 is favorably extremely thin. Therefore, the light shielding layer 51 is electrically coupled with the common electrode 22 through the second orientation film 62, and the light shielding layer 51 and the common electrode 22 have the same potential. Accordingly, electrical influence to the thin film transistor T due to a floating state of the light shielding layer 51 is suppressed.

The light shielding layer 51 is pressed against the second substrate 20 side by the organic insulating layer 50. The organic insulating layer 50 and the light shielding layer 51 function as a spacer that holds a gap between the first substrate 10 and the second substrate 20. The liquid crystal layer 30 is arranged between the first substrate 10 and the second substrate 20. The liquid crystal layer 30 modulates the light L propagated while reflected between the first substrate 10 and the second substrate 20.

In the above-described display device 100 of the present embodiment, the light shielding layer 51 and the thin film transistor T are provided on the same substrate. Therefore, the light shielding is performed in a position close to the thin film transistor T. Since the light shielding layer 51 is provided on the upper surface and the side surface of the organic insulating layer 50 having the tapered shape, the light L entering from a wide angle direction can be efficiently shielded. Therefore, the light from the wide angle direction can be shielded while making the area of the light shielding layer 51 small and increasing the aperture ratio. Since the light shielding layer 51 is electrically coupled with the common electrode 22, the potential of the light shielding layer 51 is stable. Therefore, display failure is less likely to occur. Since the organic insulating layer 50 and the light shielding layer 51 function as a spacer, it is not necessary to separately provide a spacer between the first substrate 10 and the second substrate 20.

Figure 9:
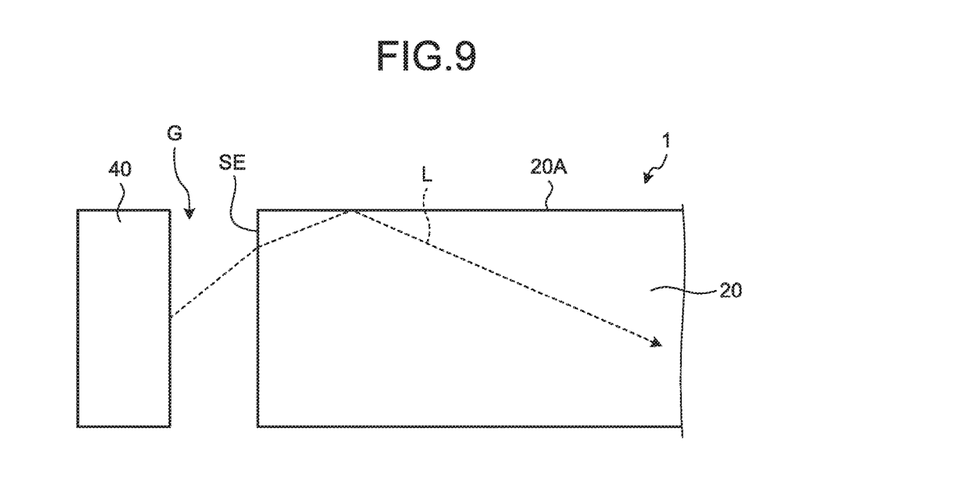
FIG. 9 is a diagram for describing behavior of incident light in a case where there is a gap between a light source unit and a light incident surface.
Figure 10:
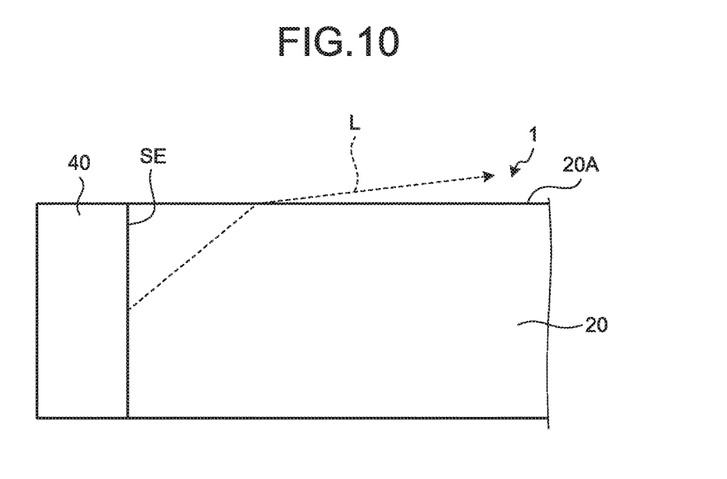
FIG. 10 is a diagram for describing behavior of incident light in a case where there is no gap between the light source unit and the light incident surface.

In the present embodiment, as illustrated in FIG. 9, the air layer G is provided between the light source unit 40 and the light incident surface SE of the display panel 1. The light L emitted from the light source unit 40 enters the light incident surface SE of the display panel 1 through the air layer G. The light L is refracted at the light incident surface SE, and enters the outer surface 20A of the second substrate 20 at a shallow angle. Therefore, the light L is less likely to leak outside the display panel 1 from the outer surface 20A. For example, as illustrated in FIG. 10, in a case where the light source unit 40 and the light incident surface SE are in contact with each other, the light L emitted from the light source unit 40 enters the outer surface 20A without being refracted at the light incident surface SE. Therefore, the angle to enter the outer surface 20A becomes large. Therefore, the light L may leak outside the display panel 1 without being totally reflected at the outer surface 20A. In the present embodiment, the amount of the light L leaking outside the display panel 1 is small, and thus a bright image can be obtained.

Second Embodiment

Figure 11:
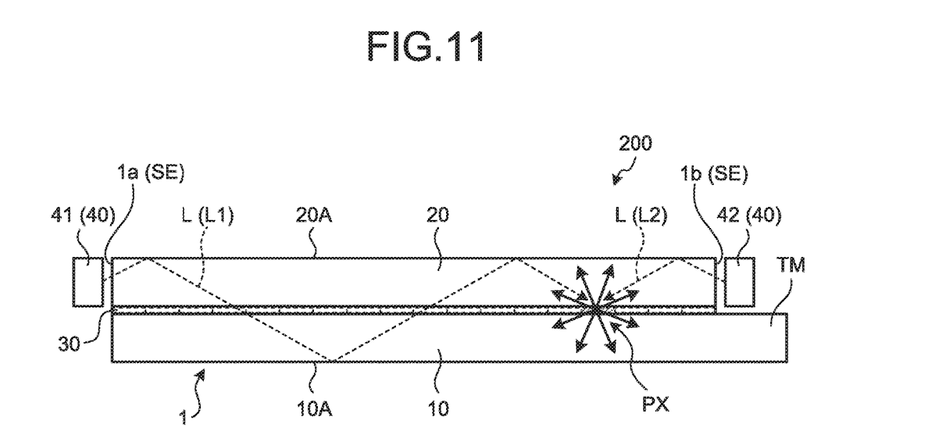
FIG. 11 is a sectional view of a display device according to a second embodiment.
Figure 12:
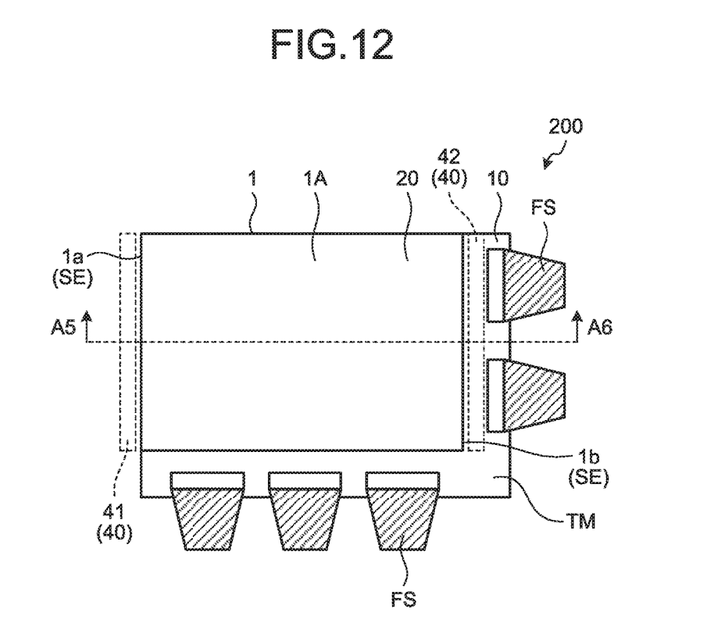
FIG. 12 is a plan view of the display device.

FIG. 11 is a sectional view of a display device 200 according to a second embodiment. FIG. 12 is a plan view of the display device 200. FIG. 11 is a sectional view along an A5-A6 line of FIG. 12. In the present embodiment, a configuration element common to the first embodiment is denoted with the same reference sign, and detailed description is omitted.

A different point in the present embodiment from the first embodiment is that a plurality of light source units 40 is provided around a display panel 1 in plan view. For example, the display device 200 is provided with a first light source unit 41 and a second light source unit 42 as the plurality of light source units 40. The first light source unit 41 and the second light source unit 42 are arranged in facing positions across the display panel 1 in cross section view. The first light source unit 41 irradiates a first end surface 1a of the display panel 1 with first light L1. The second light source unit 42 irradiates a second end surface 1b of the display panel 1 with second light L2.

The first light L1 has intensity distribution in which the intensity is highest on the first end surface 1a and is smallest on the second end surface 1b. The second light L2 has intensity distribution in which the intensity is highest on the second end surface 1b and is smallest on the first end surface 1a. The intensity distribution of the first light L1 and the intensity distribution of the second light L2 complement each other, thereby to realize uniform intensity distribution on an entire display area 1A. The light L enters the display panel 1 from the plurality of light source units 40, whereby a bright image can be obtained.

Third Embodiment

Figure 13:
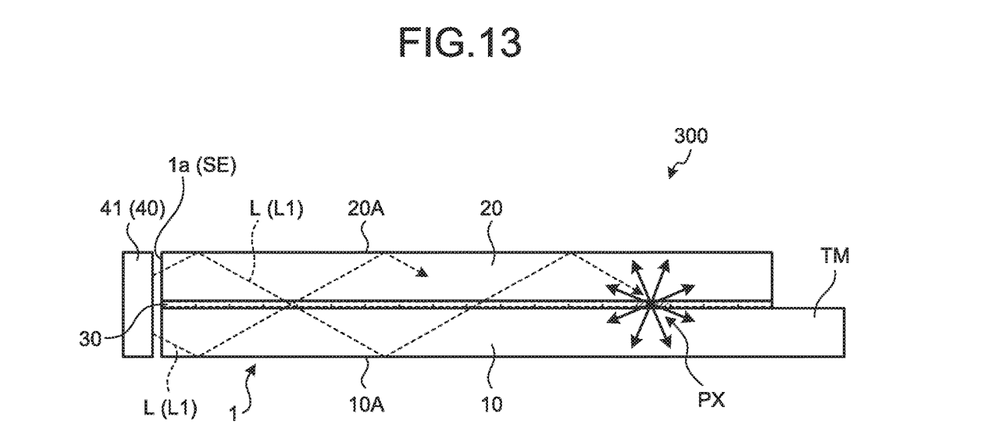
FIG. 13 is a sectional view of a display device according to a third embodiment.
Figure 14:
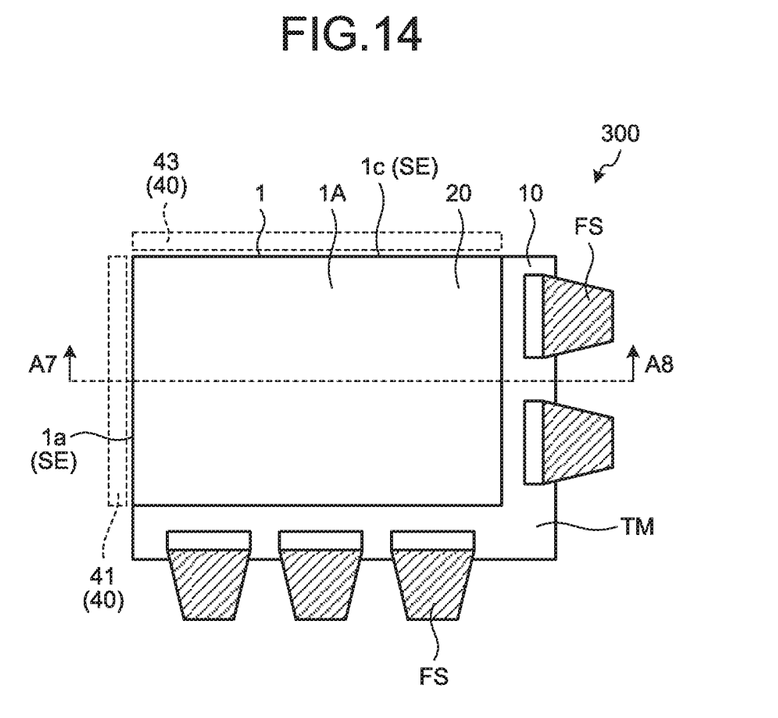
FIG. 14 is a plan view of the display device.

FIG. 13 is a sectional view of a display device 300 according to a third embodiment. FIG. 14 is a plan view of the display device 300. FIG. 13 is a sectional view along an A7-A8 line of FIG. 14. In the present embodiment, a configuration element common to the first embodiment is denoted with the same reference sign, and detailed description is omitted.

Different points in the present embodiment from the first embodiment are that a plurality of light source units 40 is provided around a display panel 1 in plan view, and the light source units 40 have a height comparable to the thickness of the display panel 1 in cross section view.

For example, the display device 300 is provided with a first light source unit 41 and a third light source unit 43 as the plurality of light source unit 40. The first light source unit 41 irradiates a first end surface 1a of the display panel 1 with first light L1. The third light source unit 43 irradiates a third end surface 1c of the display panel 1 with third light L3. The third end surface 1c is provided in a position adjacent to the first end surface 1a across a corner portion of a display area 1A in plan view. The light source units 40 are arranged to face both of a first substrate 10 and a second substrate 20. The light source units 40 cause light L to enter both of an end surface of the first substrate 10 and an end surface of the second substrate 20 at the same time.

With this configuration, the light L enters the display panel 1 from the plurality of light source units 40, and thus a bright image can be obtained.

Fourth Embodiment

Figure 15:
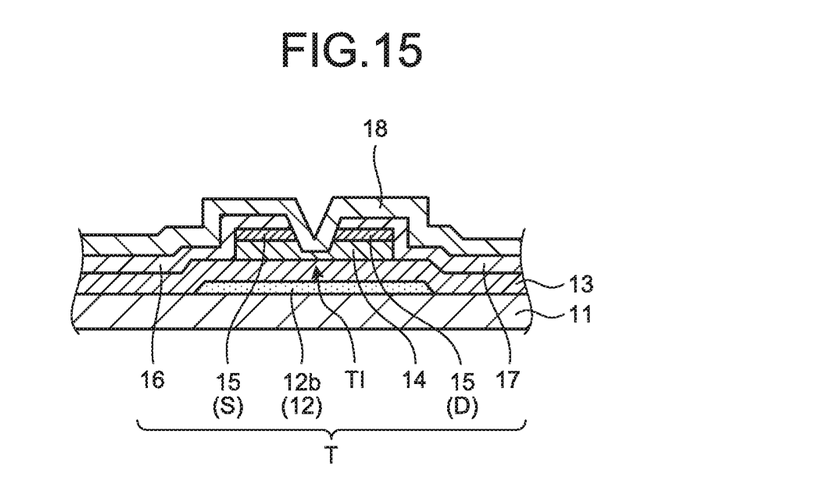
FIG. 15 is a sectional view illustrating a variation of a thin film transistor.
Figure 16:
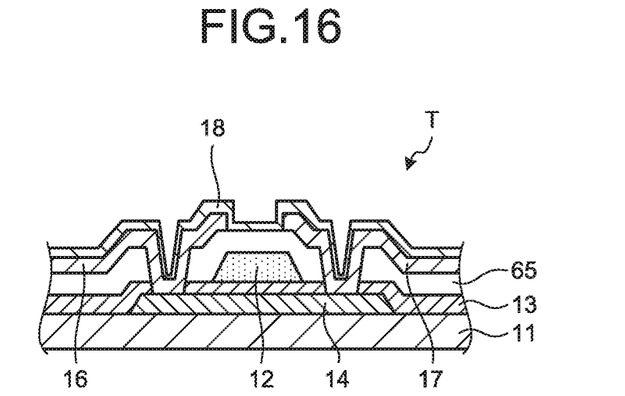
FIG. 16 is a sectional view illustrating a variation of a thin film transistor.

FIGS. 15 and 16 are sectional views of variations of thin film transistors T. In the present embodiment, a configuration element common to the first embodiment is denoted with the same reference sign, and detailed description is omitted.

In the first embodiment, a bottom gate thin film transistor using amorphous silicon has been used as the thin film transistor T. However, the configuration of the thin film transistor T is not limited thereto. For example, various thin film transistors T as illustrated in FIGS. 15 and 16 can be used.

FIG. 15 is a diagram illustrating a bottom gate thin film transistor T provided with a high concentration impurity semiconductor layer 15 between a data line 16 and an electrode 17, and a semiconductor layer 14, in cross section view.

The semiconductor layer 14 and the high concentration impurity semiconductor layer 15 are laminated in order on a gate insulating layer 13 in cross section view. The semiconductor layer 14 includes, for example, amorphous silicon. The high concentration impurity semiconductor layer 15 includes, for example, n+amorphous silicon. The high concentration impurity semiconductor layer 15 is separated into a source portion S and a drain portion D by a separation groove TI (channel etch portion). The semiconductor layer 14 exposed to a bottom surface of the separation groove TI functions as a channel forming portion of the thin film transistor T. The data line 16 that covers the source portion S and the electrode 17 that covers the drain portion D are provided on the gate insulating layer 13.

FIG. 15 illustrates an example of a channel etch thin film transistor having the separation groove TI formed in the semiconductor layer 14. However, a channel stopper thin film transistor in which an insulating layer that separates a source area and a drain area is formed on the semiconductor layer 14 may be used.

FIG. 16 is a diagram illustrating a top gate thin film transistor T. A semiconductor layer 14, a gate insulating layer 13, a gate line 12, and an interlayer insulating layer 65 are laminated in order on a first base material 11 in cross section view. A portion of the semiconductor layer 14, the portion overlapping with the gate line 12 in plan view, functions as a channel forming portion. The semiconductor layer 14 includes, for example, low-temperature polysilicon (LTPS). However, for example, the semiconductor layer 14 may include an oxide semiconductor containing oxide of indium (In), gallium (Ga), and zinc (Zn).

A data line 16 and an electrode 17 are provided on the interlayer insulating layer 65. The data line 16 is electrically coupled with the semiconductor layer 14 through a contact hole provided in the interlayer insulating layer 65. The electrode 17 is electrically coupled with the semiconductor layer 14 through a contact hole provided in the interlayer insulating layer 65.

The configurations of the thin film transistors T illustrated in FIGS. 15 and 16 are examples. A thin film transistor T having a configuration other than the configurations illustrated in FIGS. 15 and 16 is also applicable.

Fifth Embodiment

Figure 17:
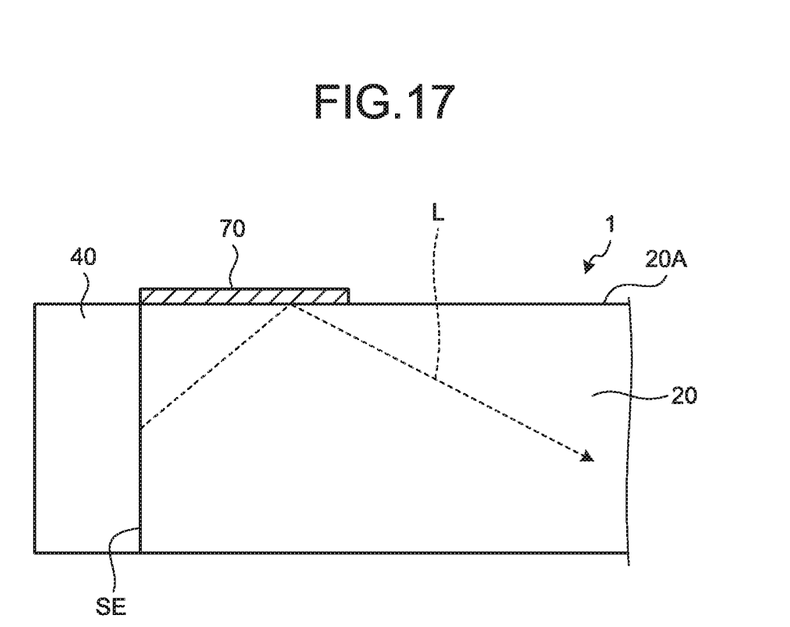
FIG. 17 is a sectional view illustrating a variation of arrangement of a light source unit.

FIG. 17 is a sectional view illustrating a variation of arrangement of a light source unit 40.

In the first embodiment, the air layer G is provided between the light source unit 40 and the light incident surface SE to suppress leakage of the light L, which has entered the light incident surface SE, by directly passing through the display panel 1. In the present embodiment, a reflecting layer 70 is provided in a position where leakage of light occurs, in place of providing an air layer G between a light source unit 40 and a light incident surface SE. A range to provide the reflecting layer 70 is determined according to a refractive index of a second substrate 20 and a flare angle of light L. The reflecting layer 70 is provided in a range in which the light L enters an outer surface 20A at an angle smaller than a critical angle.

According to this configuration, the distance between the light incident surface SE and the light source unit 40 becomes short, and thus a terminal portion TM can be made small. Therefore, downsizing of the display device can be achieved while suppressing leakage of the light from the display panel 1.

Favorable embodiments of the present invention have been described. However, the present invention is not limited to these embodiments. The content disclosed in the embodiments is merely examples, various modifications can be made without departing from the points of the present invention. Appropriate modifications made without departing from the points of the present invention obviously belong to the technical scope of the present invention. All of inventions that would be appropriately designed and modified, and implemented by a person skilled in the art on the basis of the above-described invention also belong to the technical scope of the present invention as long as the inventions include the gist of the present invention.

For example, in the above-described embodiments, the configuration to emit the light L from the end surface of the display panel 1, and to scatter, in the liquid crystal layer 30, the light L propagated inside the display panel 1 to display an image has been exemplarily described. However, the configuration of the display device 100 to which the present invention is applied is not limited to the example. For example, the present invention may be applied to a configuration to emit light from the outer surface 10A side (an opposite side to the liquid crystal layer 30 side) of the first substrate 10 with a backlight, and to modulate the light by the liquid crystal layer 30. In this case, the display system of the display panel 1 may be a transverse electric field system such as a fringe field switching (FFS) system, or may be a vertical electric field system such as a twisted nematic (TN) system. In this case, light from outside entering from a wide angle direction from a second substrate 20 side toward a thin film transistor T can be efficiently shielded by a light shielding layer 51. In this case, the member to form the light shielding layer 51 is not limited to a light reflecting member that reflects the light from outside, and may be a light absorbing member that absorbs the light from outside.

The present invention can be widely applied to a display device according to the following aspects.

(1) A display device comprising:
a first substrate including at least a thin film transistor;
a second substrate including a common electrode;
an organic insulating layer arranged on the first substrate so as to overlap with the thin film transistor, and projecting from the first substrate toward the second substrate; and
a conductive light shielding layer covering an upper surface and a side surface of the organic insulating layer, and electrically coupled with the common electrode, wherein
the organic insulating layer and the light shielding layer hold a gap between the first substrate and the second substrate.

(2) The display device according to (1), comprising:
a liquid crystal layer arranged between the first substrate and the second substrate, wherein
the liquid crystal layer modulates light, the light being propagated while reflected between the first substrate and the second substrate, wherein
the light shielding layer reflects the light.

(3) The display device according to (1) or (2), wherein
the liquid crystal layer is a polymer dispersed liquid crystal layer.

(4) The display device according to any one of (1) to (3), wherein
the organic insulating layer has a tapered portion,
the tapered portion has a bottom surface facing the first substrate and the upper surface facing the second substrate,
the bottom surface is larger than the upper surface.

(5) The display device according to any one of (1) to (4), wherein
the thin film transistor is a bottom gate thin film transistor.

(6) The display device according to (5), comprising:
at least a gate line electrically coupled with the thin film transistor, wherein
the light shielding layer is provided not to protrude from the gate line as viewed from a side of the second substrate.

(7) The display device according to any one of (1) to (6), comprising:
a plurality of pixels each including,
a pixel electrode,
the thin film transistor,
the common electrode, wherein the scattering state of the liquid crystal layer is controlled for each pixel with a voltage applied between the pixel electrode and the common electrode.

(8) The display device according to (4), wherein a projecting portion of the organic insulating layer that projects from the first substrate toward the second substrate is the tapered portion.

What is claimed is:

1. A display device comprising:
a first substrate including at least a thin film transistor;
a second substrate including a common electrode;
an organic insulating layer arranged on the first substrate so as to overlap with the thin film transistor, and projecting from the first substrate toward the second substrate; and
a conductive light shielding layer covering an upper surface and a side surface of the organic insulating layer, and electrically coupled with the common electrode, wherein
the organic insulating layer and the light shielding layer hold a gap between the first substrate and the second substrate.

2. The display device according to claim 1, comprising:
a liquid crystal layer arranged between the first substrate and the second substrate, wherein
the liquid crystal layer modulates light, the light being propagated while reflected between the first substrate and the second substrate, wherein
the light shielding layer reflects the light.

3. The display device according to claim 1, wherein the liquid crystal layer is a polymer dispersed liquid crystal layer.

4. The display device according to claim 1, wherein
the organic insulating layer has a tapered portion,
the tapered portion has a bottom surface facing the first substrate and the upper surface facing the second substrate,
the bottom surface is larger than the upper surface.

5. The display device according to claim 1, wherein the thin film transistor is a bottom gate thin film transistor.

6. The display device according to claim 5, comprising:
at least a gate line electrically coupled with the thin film transistor, wherein
the light shielding layer is provided not to protrude from the gate line as viewed from a side of the second substrate.

7. The display device according to claim 1, comprising:
a plurality of pixels each including,
a pixel electrode,
the thin film transistor,
the common electrode,
wherein a scattering state of the liquid crystal layer is controlled for each pixel with a voltage applied between the pixel electrode and the common electrode.

8. The display device according to claim 4, wherein a projecting portion of the organic insulating layer that projects from the first substrate toward the second substrate is the tapered portion.

* * * * *